United States Patent [19]

Kraft et al.

[11] Patent Number: 4,551,122
[45] Date of Patent: Nov. 5, 1985

[54] MANUFACTURE OF POLY-V SHEET METAL PULLEYS AND PRODUCT

[75] Inventors: Derald H. Kraft, Canton; Gary L. Hitchcock, Massillon, both of Ohio

[73] Assignee: Dyneer Corporation, Canton, Ohio

[21] Appl. No.: 468,654

[22] Filed: Feb. 22, 1983

[51] Int. Cl.[4] .................... F16H 55/44; B21D 53/26
[52] U.S. Cl. ........................ 474/170; 72/83; 29/159 R
[58] Field of Search ............... 474/170; 72/82, 83, 72/84, 105; 29/159 R

[56] References Cited

U.S. PATENT DOCUMENTS

| | | | |
|---|---|---|---|
| 1,671,994 | 6/1928 | Nelson | 29/159 R |
| 2,247,002 | 6/1941 | Rendleman | 29/159 R |
| 2,869,223 | 1/1959 | Killian et al. | 29/159 R |
| 3,368,376 | 2/1968 | Previte | 72/82 |
| 3,977,264 | 8/1976 | Sproul | 474/170 |
| 4,050,321 | 9/1977 | Kraft | 474/170 |
| 4,273,547 | 6/1981 | Bytzeck | 474/170 |

Primary Examiner—Stephen J. Novosad
Assistant Examiner—Bruce M. Kisliuk
Attorney, Agent, or Firm—Frease & Bishop

[57] ABSTRACT

A sheet steel poly-V-grooved pulley having a special cross-sectional contour is made optionally by any one of three different cold working manufacturing procedures. Special physical properties or characteristics are developed in the pulley by the manner in which the metal in the V-groove body and single and double walled terminal flanges are cold worked. The cold working involves forming in stages of manufacturing from a cup-shaped blank to the finished pulley product a stepped inner body wall surface equivalent to a tapered surface with improved substantially uniform torque transmitting strength in the grooved body from web wall to open end. Also involved in the cold working is an increase in pulley diameter in certain portions of the finished pulley and a decrease in diameter in other portions from the diameter of the side wall of the cup shaped starting blank.

13 Claims, 16 Drawing Figures

FIG.5A

MANUFACTURE OF POLY-V SHEET METAL PULLEYS AND PRODUCT

CROSS-REFERENCE TO RELATED PATENTS

The new pulley manufacture and product are improvements upon the pulleys and manufacture thereof shown and described in U.S. Pat. Nos. 3,977,264 and 4,050,321.

BACKGROUND OF THE INVENTION

1. Field of the Invention

The invention relates to a poly-V type sheet metal pulley and to the manufacture thereof, and more particularly to the manufacture of such pulleys by spinning or combined spinning and press operations and to the resultant product, wherein increased strength is imparted to the pulley product by the formation of particular cross-sectional contours in the pulley body at various stages in its manufacture as well as in the resultant pulley product.

2. Description of the Prior Art

There is a great variety of types of sheet metal poly-V pulley structures in the prior art as well as many different procedures that have been used in the manufacture thereof. The effort in the prior art has been to utilize the least amount of metal possible in the manufacture of sheet metal poly-V type pulleys, while, at the same time, satisfying strength requirements of the poly-V-grooved body portion in various zones thereof.

The pulley of U.S. Pat. No. 3,977,264, while providing adequate strength for torque loading, uses more metal than is necessary to provide the required strength at the bases of the poly-V grooves and in its radially projecting terminal flange at the open end of the pulley.

U.S. Pat. No. 4,050,321 illustrates the manner in which a stepped interior surface may be provided to reduce the thickness of the cylindrical wall portion of the cup-shaped stage blank used in forming a multiple V-grooved pulley having a groove wall sinuous in cross section.

There exists a need in the art for a sheet metal poly-V pulley having characteristics, among others, imparted by using a cup-shaped stage blank having a generally cylindrical cup wall with a stepped interior surface, in the manufacture of poly-V pulleys to provide a strong poly-V-grooved body and one with less metal than characterizes prior art sheet metal poly-V pulleys. Further, there is a need for a poly-V pulley having particular cross-sectional contours for the angular outwardly projecting single wall flange which defines the open end of the V-grooved body.

SUMMARY OF THE INVENTION

Objectives of the invention include providing a new sheet metal poly-V-grooved pulley having improved physical properties, improved strength and strength distribution characteristics for torque transmission, and improved cross-sectional contours of the pulley body wall and terminal flanges resulting from the nature and direction of cold working pressures and metal flow occurring in stages of the manufacture of the pulley from cup-shaped blank to finished pulley product; providing optional new procedures for pulley manufacture from cup-shaped blank to final V-grooved product; providing in said such new procedure for forming a stepped inner body wall surface substantially equivalent to a tapered surface with improved substantially uniform torque transmitting strength to the grooved body from pulley web wall to open end; providing in such procedures for multi-directional displacement and pressure and extrusion cold flow off metal in the pulley body to thicken certain zones and thin other zones and to increase the diameter of certain portions and decrease the diameter of other portions of the metal being cold worked from the thickness and diameter of the metal sidewall of a cup-shaped blank from which the pulley V-grooved body wall and terminal flanges are formed; and providing such new procedures for the manufacture of such new poly-V pulley products by spinning operation using spin rolls of simple designs that may be readily controlled and operated.

The general nature of the new pulley product may be generally stated as being a poly-V-grooved pulley of the type having a V-grooved body wall formed from the side wall of a cup-shaped blank in which the body wall terminates in out-turned single and double walled flanges with the double walled flange joined with a pulley web wall, wherein the improvement comprises a grooved body wall inner annular surface having a stepped contour of increasing size from pulley web wall to the open end of the pulley, thereby providing substantially uniform torque transmitting cantilever beam-like strength to the pulley from web wall to the open end of the pulley.

The general nature of pulley-making procedures involves methods of cold working side wall metal of a cup-shaped sheet metal blank under axial and radial pressure to form a V-grooved body wall of a poly-V-grooved type pulley having terminal body wall single and double wall flanges and a web wall joined with the double wall flange, wherein the improvement comprises reducing the axial length and increasing the thickness of said side wall metal by said axial and radial pressure to form an annular body wall inner surface with a stepped contour of increasing size from pulley web wall to the pulley open end.

BRIEF DESCRIPTION OF THE DRAWINGS

Preferred embodiments of the invention, both method and product-illustrative of the best modes in which Applicants have contemplated applying the principles-are set forth in the following description and shown in the drawings and are particularly and distinctly pointed out and set forth in the appended claims.

Similar numerals refer to similar parts in the drawings.

DESCRIPTION OF THE PREFERRED EMBODIMENTS

In General

One aspect of the invention involves several different procedures or series of steps in the manufacture of poly-V pulleys from sheet metal which initially is formed to cup shape, either by spinning or by press-drawing operations. The cup shape may be generally the same for each of the several procedures; excepting for the thickness of the sheet metal from which the cups are formed, for the thickness of the bottom or web wall of the cup, or for the thickness in the cylindrical cup side or body wall.

Depending upon the particular manufacturing procedure selected, these thicknesses may vary, and in addition, other dimensional characteristics of the cup-shaped starting blank, such as the axial length of the cylindrical cup side or body wall, may vary slightly.

Figures 1, 2, 3, 9, 10, 11, 12:
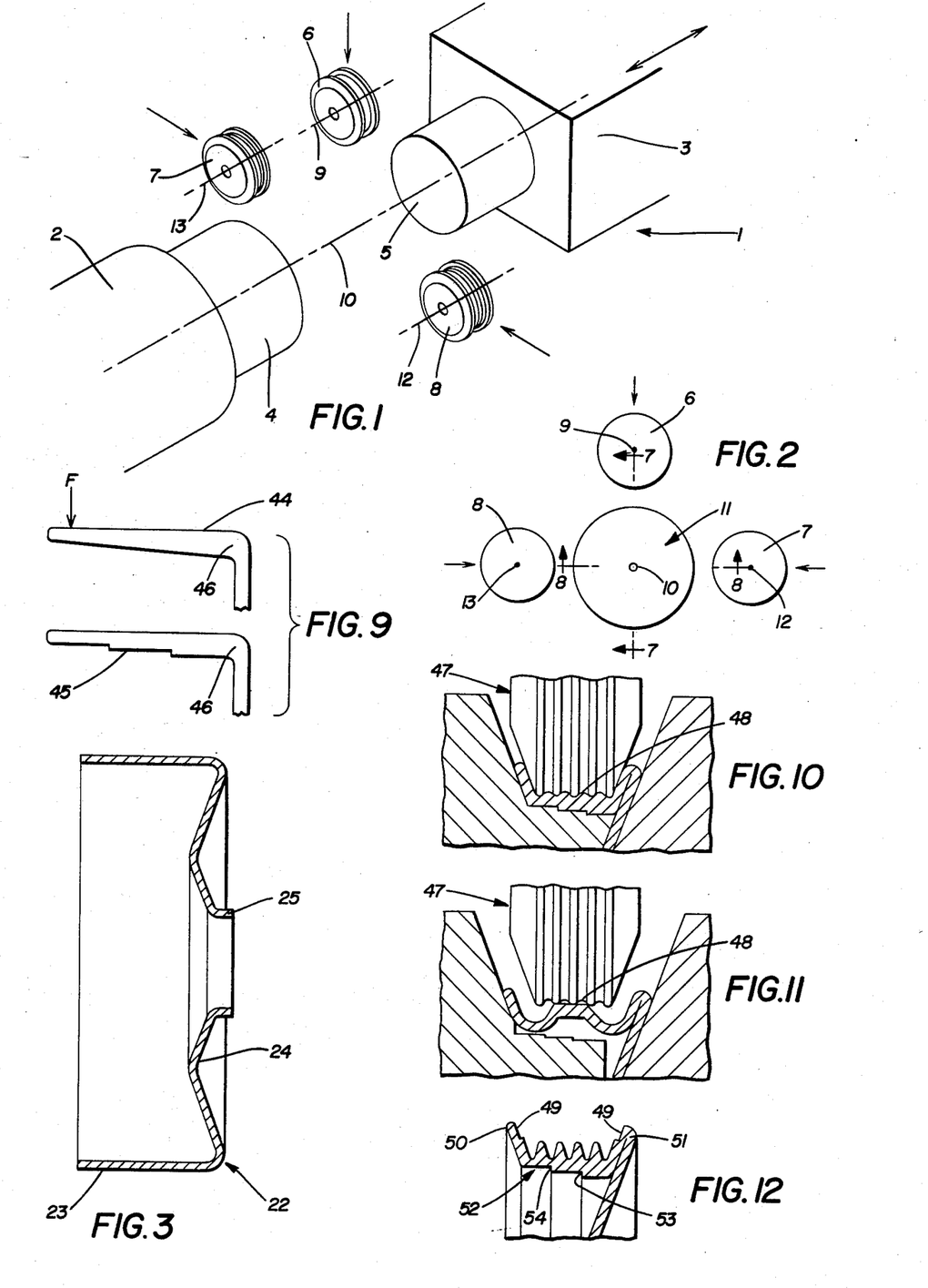
FIG. 1 is an exploded perspective diagrammatic view of components of a metal spinner used to carry out the manufacture of poly-V sheet metal pulleys in accordance with the invention.
FIG. 2 is a diagrammatic view looking axially of the spinner of FIG. 1 from the tail stock toward the head stock illustrating locations of several different spin rolls used in the pulley manufacture.
FIg. 3 is an axial sectional view of a typical cup-shaped blank used as a starting blank for the pulley manufacture.
FIG. 9 is a fragmentary comparative diagrammatic view illustrating the equivalence of a stepped interior cup wall surface of the cup-shaped blank of FIG. 6A to a similar cup-shaped blank having a tapered or angular interior cup wall surface.
FIG. 10 is a fragmentary view of a portion of FIG. 4 using a modified form of rippled or grooved spin roll.
FIG. 11 is a fragmentary view of a portion of FIG. 8 using the modified form of rippled or grooved spin roll of FIG. 10.
FIG. 12 is a fragmentary sectional view of a pulley body wall cross-sectional contour similar to a portion of FIG. 5A with modified shapes of the outer ends of the single and double walled flanges and of the inner stepped surface.

Notwithstanding the described dimensional differences that may be present in the cup-shaped starting blank, of which FIG. 3 is representative, the final poly-V pulley product produced by each of the several procedures will have the same general characteristics for any pulley having the same diameter and the same number of poly-V grooves. In other words, the new procedures may be used in manufacturing any desired pulley size.

Another aspect of the invention involves forming a stepped contoured pulley body wall inner surface cross-sectional shape during one stage in the pulley manufacture to obtain new structural and physical characteristics in the finished sheet metal poly-V pulley product.

The stepped interior surface of the pulley body wall that is formed in each of the several procedures initially is formed at a time when the body wall is thickened by either a press or a spinning operation.

A further aspect of the invention involves increasing the outer diameter of the angular end flanges defining the ends of the poly-V groove formations in the pulley body wall having the stepped inner surface from the outer diameter of the cup-shaped starting blank. This increased outer diameter of the pulley is accompanied by radially locating the inner stepped circumferential surface of the pulley body wall closer to the pulley axis than the radial location of the inner surface of the side or body wall of the cup-shaped blank from which the pulley is formed.

Still another aspect of the invention involves providing theoretically uniform torque transmitting strength throughout the axial extent of the poly-V-grooved wall to resist stress imparted thereto. That is, the grooved wall has strength from pulley web wall to its outer open end characteristic of a beam supported at one end having a tapering thickness which diminishes to the unsupported outer beam end.

In practice such a tapered inner surface of the cup body wall is difficult to form in press operations or by spinning operations because of the tendency of such operations to tighten the cup on the forming mandrel or punch, rendering removal difficult. The formation of a stepped surface approaches that of a tapered surface and, thus, is the equivalent of a tapered surface. Thus the V-grooved body with the inner stepped surface has physical properties equivalent to those of a V-grooved body having a tapered inner surface in cross section which has a larger diameter at the open pulley end than at the pulley web wall.

The foregoing aspects or facets of the invention characterize each of the several manufacturing procedures contemplated by the invention which are severally described below.

A typical sheet metal spinning machine diagrammatically illustrated at 1 in FIG. 1, may have a head stock 2, and a tail stock 3 on which head stock tooling 4 and tail stock tooling 5 may be mounted in a typical manner. The tail stock is movable axially toward and away from the head stock. A pulley blank 11 may be engaged by the head and tail stock tooling and rotated by the head stock.

A plurality of different spin rolls are mounted for radial movement toward the spinner axis 10 to engage and spin or otherwise work a rotating pulley blank 11.

As shown in FIGS. 1 and 2, there may be three different spin rolls 6, 7 and 8. The axis 9 of roll 6 is parallel to the spinner axis 10 and is located preferably vertically above the spinner axis 10 for movement radially toward and away from the pulley blank 11.

The axis 12 of spin roll 7 is located parallel to the spinner axis 10 and has a 90° clockwise location from the axis 9 of spin roll 1 viewing FIG. 2. Spin roll 7 is movable radially toward and away from pulley 11.

Spin roll 8 may similarly be located with its axis 13 parallel to the spinner axis 10 90° counterclockwise from the spin roll axis 9 viewing FIG. 2. Spin roll 8 is movable radially toward and away from the pulley blank 11.

Rotation of the head stock tooling and movement severally of the spin rolls toward and away from the spinner axis typically is coordinated and controlled by programmable control equipment known in the art.

Figure 7:
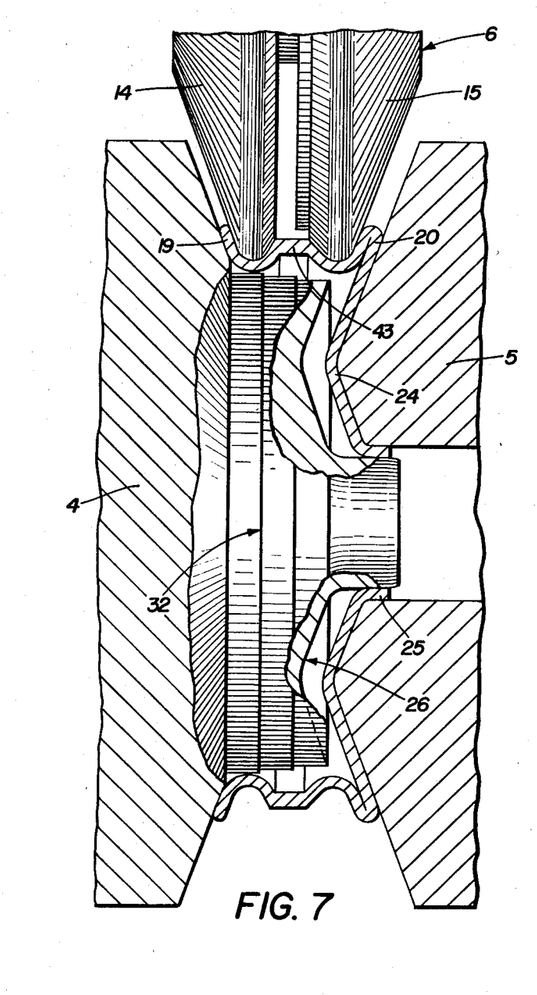
FIG. 7 is a sectional view similar to FIGS. 4 and 5 looking in the direction of the arrows 7—7, FIG. 2, illustrating a spin-forming operation carried out with a split spin roll in cooperation with a simultaneously acting fixed position spin roll of the type shown in FIG. 4.
Figure 8:
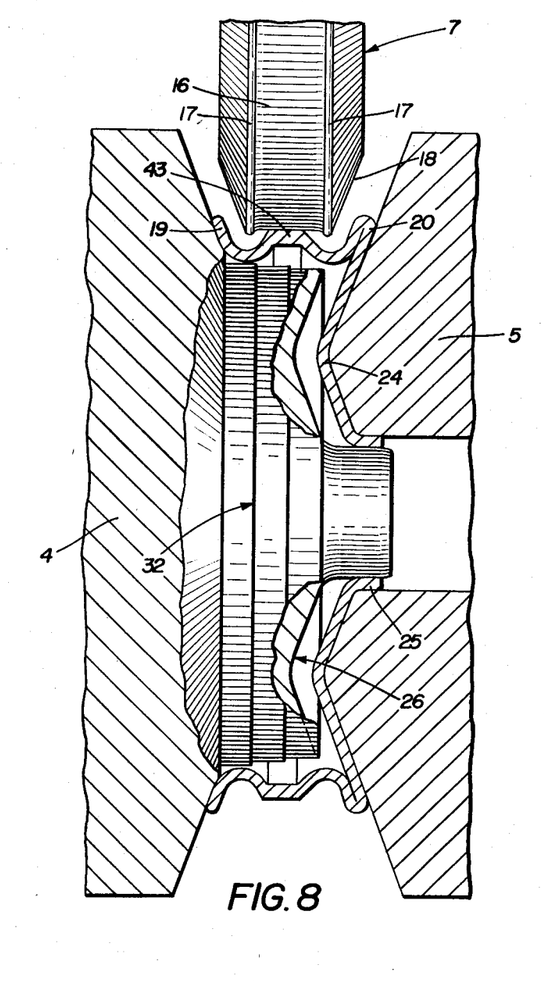
FIG. 8 is a sectional view similar to FIG. 7 but looking in the direction of the arrows 8—8, FIG. 2, illustrating the fixed position of the FIG. 4 type spin roll while the spin roll of FIG. 7 performs its spinning function.
Figure 8A:
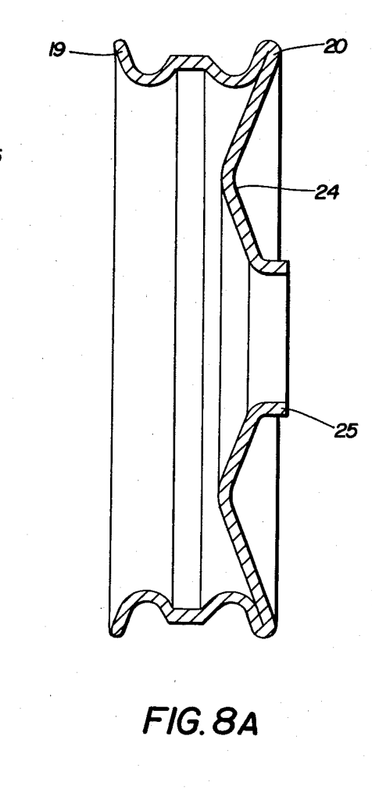
FIG. 8A is a sectional view similar to FIG. 3 showing the stage blank produced by the FIGS. 7-8 operation.

The spinner 1 may be a lathe type machine and the head stock 2 is located in a fixed position. The tail stock 3 is movable along the axis 10. High pressure may be exerted by the tail stock tooling 5 during movement toward the head stock 2. Tail stock movement toward the head stock tooling 4 collapses and clamps split spin roll 6 having relatively movable sections 14 and 15, and wall portions of the pulley blank 11 against head and tail stock tooling during the spinning operation, as illustrated in FIGS. 7 and 8. The split spin roll 6 is shown in the position it assumes at the completion of its spinning operation in FIG. 7, described below.

Figure 4:
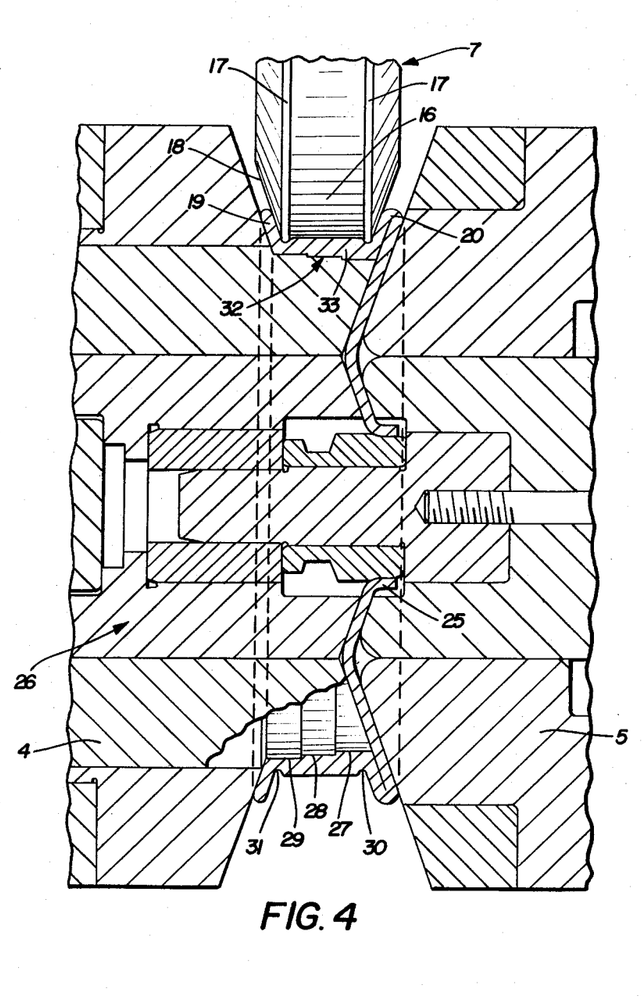
FIG. 4 is a fragmentary sectional view of portions of a spinner head stock and tail stock after completing an intermediate spinning operation on a cup-shaped starting blank using one form of spin roll.

Spin roll 7 has a generally cylindrical metal working surface as indicated at 16 in FIG. 4. The cylindrical surface 16 has slightly projecting rounded metal working terminal flanges 17. The outer end surfaces of terminal flanges 17 of spin roll 7 are outwardly conically shaped at 18 to form the outwardly angled pulley flanges 19 and 20 as described below and as shown in FIG. 4.

Figures 4A, 5A:
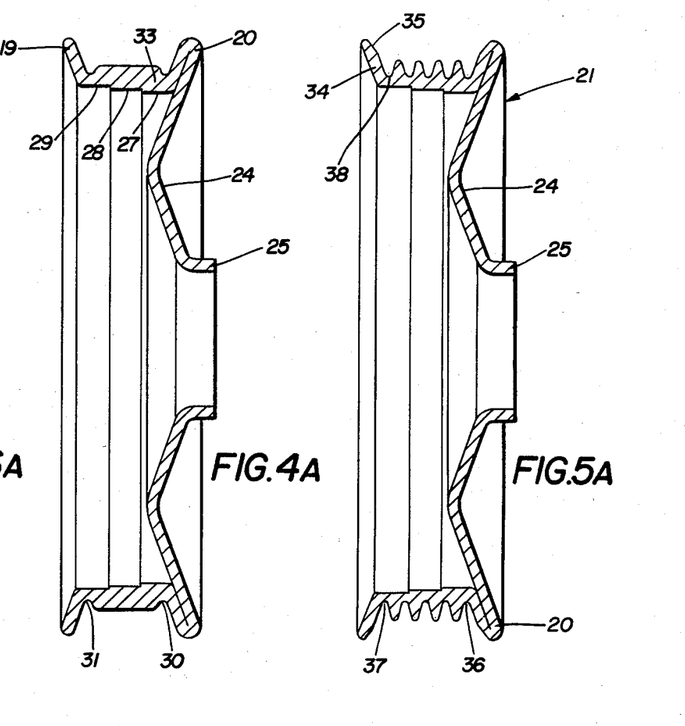
FIG. 4A is a sectional view similar to FIG. 3, showing the shape of the pulley blank at a stage produced by the spinning operation using the spin roll shown in FIG. 4.
FIG. 5A is a sectional view similar to FIGS. 3 and 4A showing the finished pulley produced by the spinning operation using the spin roll shown in FIG. 5.
Figure 5:
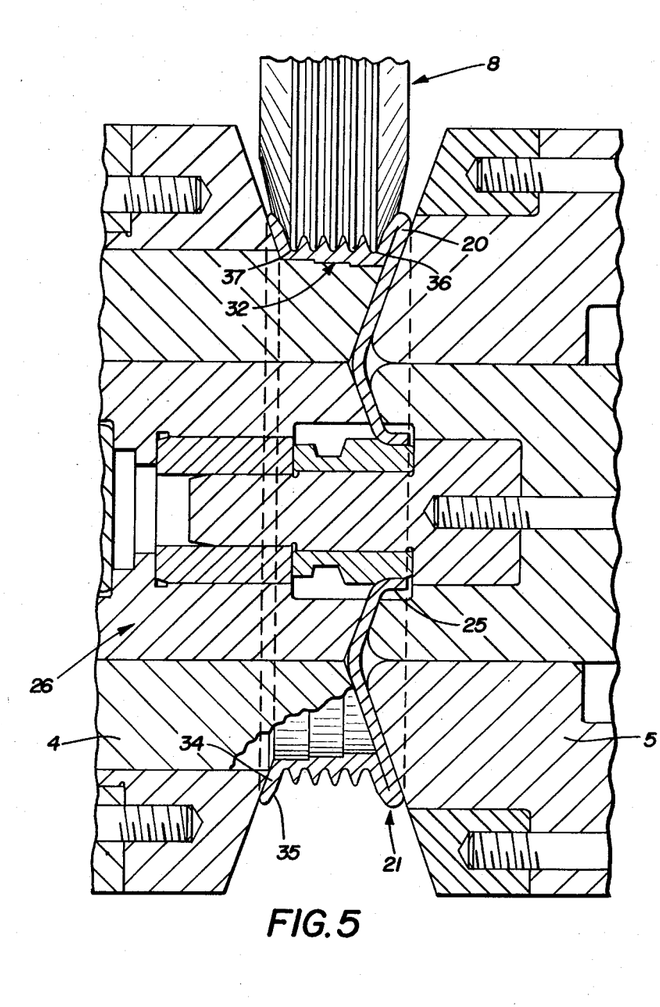
FIG. 5 is a view similar to FIG. 4 illustrating a final spinning operation using another form of spin roll to form the poly-V grooves in the pulley.

Spin roll 8 has a poly-V groove forming outer annular surface as shown in FIG. 5 for the final spinning operation to complete the formation of the poly-V grooved pulley product 21 shown in FIG. 5A, as further described below.

First Embodiment or Procedure

The manufacture of a poly-V groove pulley may start with a cup-shaped sheet metal blank 22 shown in FIG. 3. The cup-shaped blank optionally may be formed by known press operations or spinning operations. The blank 22 has a cylindrical side or body wall 23, a web wall 24 and a hub 25. The shape of the web wall 24 is not important since it may have the shape as shown in FIG. 3, or it may be flat or extend conically outward axially rather than inward as illustrated.

The procedure now being described starts with typical known press operations, not shown, to form the cup-shaped blank 22, for example, from 0.115" thick preferably steel sheet meal. The cup body wall and web 23 and 24 also are 0.115" thick.

The cup-shaped blank 22 is placed and clamped in a spinner 1 between the head stock and tail stock tooling 4 and 5. The tail stock 3 is moved under high pressure toward the head stock 2 while the latter rotates the blank 22. Spin roll 7 is moved toward and engages the rotating blank until it reaches home position as illustrated in FIG. 4.

During this spinning operation the stepped annular surface 32 of head stock mandrel 26 forms a stepped inner surface on the stage blank shown in FIG. 4A produced by the operation illustrated in FIG. 4.

The stepped surface of stage blank 4A is composed of surfaces indicated in FIG. 4A at 27, 28 and 29. The body wall thicknesses produced in portions 27, 28 and 29 may change in increments of 0.002", such as pulley body wall thicknesses of 0.119" at 27, 0.117" at 28 and 0.115" at 29 and a minimum thickness of 0.070" at the grooves 30 and 31. The flange and web wall thicknesses are 0.115".

The increment of change in thickness of portions 27, 28 and 29 is not necessarily 0.002", but may be say 0.004" depending upon the design of the particular pulley. Further, the number of steps in the stepped surface 32 is not necessarily three steps. For example, a pulley with four poly-V-grooves may have only one step, that is two stepped surfaces. A pulley with five to six grooves may have two steps, a pulley having eight to ten grooves may have four to five steps, etc., depending upon the design, and size of the pulley and the metal thicknesses that may be required in portions of the final product.

The stepped inner body wall surface 32 with various incremental thickness changes and numbers of steps provides a body wall surface substantially equivalent to a tapered inner surface with substantially uniform torque transmitting strength from pulley web wall to the open end of the pulley.

During spinning operation shown in FIG. 4 the metal in the body wall 23 of the cup-shaped blank 22 is displaced and flows to its re-formed state which involves the volume of metal in the body wall 23 of the blank 22. Portions of the volume of metal are extruded or flow outward to form the single pulley flange 19, and the double pulley flange 20 by cold working pressures between the head and tail stock tooling and the spin roll 7. A larger pulley diameter than the diameter of the cup-shaped blank 22 results.

Part of the volume of metal flows under pressure inward between cylindrical surface 16 of the spin roll 7 and the stepped annular surface 32 of the head stock mandrel 26. This inward displacement of flow of portions of the volume of metal being worked reduces the radial location thereof which is accompanied by a thickening of the body well known in the art.

At the same time, the rounded terminal flanges 17 on the spin roll 7 in forming the pulley grooves 30 and 31 aid in lateral inward displacement between the flanges 17 of portions of the volume of metal being cold worked. As a result of the combined working pressures occurring during the spinning operation of FIG. 4, the thickened pulley wall 33 is produced.

The inward flow of metal toward the spinner axis 10 occurring during the spinning operation of FIG. 4 results in a decrease in radial location of the metal in the body wall as compared with the diameter of the body wall 23 of the cup-shaped blank 22.

Meanwhile, the final spinning stage proceeds by moving spin roll 8 towards the spinner axis 10. The spin roll 8 may approach and commence its spinning function on the rotating blank before spin roll 7 has reached its home position of FIG. 4.

The outer end contours of spin roll 8 are the same where the roll engages double pulley flange 20 but differs slightly where the roll engages single pulley flange 19. The spin roll 8 has an end surface shaped to form the final single pulley flange 34 with a thinner or tapered extremity indicated at 35 to avoid belt damage and permit ease of belt engagement to and with the pulley when installed in belt engaging relation.

As spin roll 8 proceeds with the formation of the poly-V grooves, the grooves 30 and 31 in the stage blank of FIG. 4A guide the ridges 36 and 37 at the axial ends of spin roll 8 into the final forming zone so as to displace metal only axially laterally toward each other in filling out the end V-shaped ridges in the finished poly-V-grooved pulley 21 (FIG. 5A).

This cooperative function of the grooves 30 and 31 with the final spin roll 8 operation prevents the build-up of pulley metal stress in the final spinning operation where the flanges 19 and 20 have previously been formed to extend angularly outwardly from the ends of the thick body wall portion 33.

It is preferred, in accordance with the thickness dimensions previously indicated, for example, that the minimum thickness of the body wall below the V-groove 38 formed by the spin roll ridge 37 should be about 0.045".

The stepped surface 32 of headstock mandrel 26 forms the stepped inner surface of the pulley being spun by the combined actions of the spin rolls 7 and 8, as described above. The contour of the inner stepped surface of the blank composed of stepped surface portions 27, 28 and 29, as shown in FIGS. 4 and 4A, does not change during the final forming of the poly-V pulley grooves by the spin roll 8, as shown in FIGS. 5 and 5A. Thus, the radial thickness of the thickened body wall metal of the finished poly-V pulley product of FIGS. 5 and 5A at the valley of the V-groove 38 adjacent the single walled flange 34 is thinner than the radial thickness of the thickened body wall metal at the valley of the V-groove adjacent the double walled flange 20.

Second Embodiment or Procedure

The alternate procedure for forming the final pulley product 21 of FIG. 5A involves preparing a cup-shaped blank 22 of FIG. 3 by press operations from 0.093" thick sheet stock. This cup-shaped blank 22 has 0.093" thick body and web walls 23 and 24.

Figure 6:
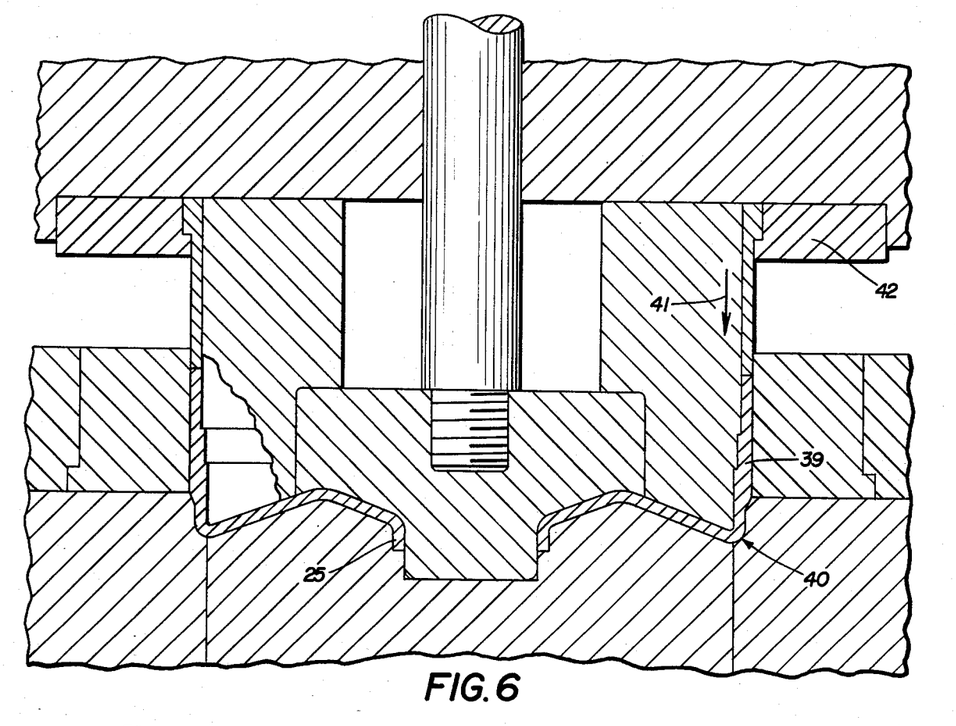
FIG. 6 is a sectional view of a press operation which may be used to axially squeeze, and radially reduce the diameter of a cup-shaped blank such as shown in FIG. 3 to thicken or fatten the cup side wall or body, and to form a stepped interior surface for said cup side wall, to prepare the cup-shaped blank further for subsequent spin-forming.
Figure 6A:
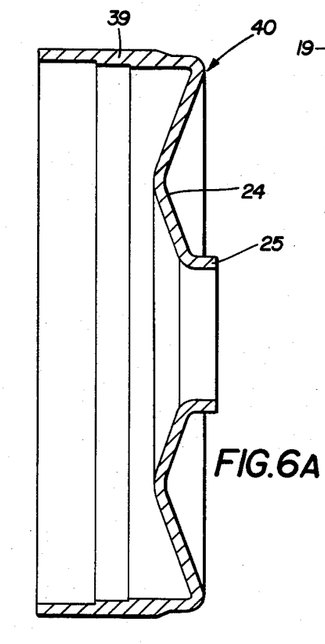
FIG. 6A is a sectional view similar to FIG. 3, showing the stage blank produced by the press operation of FIG. 6.

The cup-shaped blank 22 then is subjected to the press operation of FIG. 6 to produce the thickened and stepped inner surface body wall 39 of modified cup-shaped blank generally indicated at 40 in FIG. 6A. In the press operation, an axial force represented by the arrow 41 is applied by the punch 42 against the annular open end edge of the blank 22 to shorten, fatten and thicken the body wall 39 as shown in FIG. 6A so as to provide step thicknesses, respectively, of 0.115", 0.117", and 0.119", terminating in a thickness of 0.100" in the body wall region where the body wall is connected with the cup web which retains its 0.093" thickness. In this manner, the modified cup shape of the cup blank 40 is prepared for a first spinning operation initially with spin roll 7 as illustrated in and described in connection with FIG. 4.

The spinning operations proceed with functioning of the final V-grooved spin roll 8 as illustrated in and described in connection with FIGS. 5 and 5A.

Accordingly, the alternate procedure just described starts with a cup-shaped blank of FIG. 3 and continues with the steps or stages shown successively in FIGS. 6A, 4A and 5A to produce a pulley similar to that described in the above First Procedure section.

Third Embodiment or Procedure

The starting blank for this procedure may be a cup-shaped blank 22 of FIG. 3 formed by press operations from 0.093" thick parent sheet metal with the body wall 23 and web 24 of blank 22 having the same thickness. The blank 22 is placed in spinner 1 and during tail stock pressure movement toward the head stock is first engaged by split spin roll 6. The roll 6 spinning operation starts and the roll moves radially part way inward toward the spinner axis 10 as shown in FIG. 7.

Meanwhile, as spin roll 6 moves inward, spin roll 7 is moved inward to an intermediate position shown in FIG. 8 and held in such fixed position to prevent the bulge 43 being formed by spin roll 6 from moving radially outwardly beyond the position of the bulge 43 shown in FIG. 8.

In other words, there is coordinated operation of the split spin roll 6 and the cylindrical portion 16 of spin roll 7 maintained in said fixed radial position during the entire spinning action of split roll 6 until that roll reaches a home position. At that time, spin roll 7 moves inward from the position of FIG. 8 until the stage blank shape of FIG. 4A shown in FIG. 4 is formed.

At this stage in the spinning procedure, the stage blank of FIG. 4A is the same as and has the same dimensional characteristics as previously described in the First and Second Procedures.

Meanwhile, the spin roll 8 is actuated to form the poly-V-grooved pulley product 21 illustrated in FIGS. 5 and 5A.

SpeciaL Matters

The stepped body wall inner surfaces of the pulleys described have been indicated as being the equivalent of tapered surfaces which result in improved substantially uniform torque transmitting strength in the body from pulley web wall to its open end. This feature is diagrammatically illustrated in FIG. 9. A tapered cantilever beamlike member is indicated at 44 and an equivalent stepped surface cantilever beamlike member is indicated at 45. Such cantilever beams have substantially uniform strength, from their fixed supported portions 46 to their outer ends, against bending by a force indicated by the arrow F applied to the beam ends.

Such pulley walls accordingly have cantilever beam characteristics provided by the stepped contour of increasing size from pulley web wall to the open end of the pulley, which provides uniform torque transmitting strength in the groove body from web (beam support) wall to the open end of the pulley.

FIGS. 10 and 11 illustrate a spin roll 47 with a laterally wavy or rippled metal-forming surface 48, modified from the cylindrical work-engaging surface 16 of spin roll 7. This rippled spin roll 47 may be used to aid in starting the formation of the poly-V grooves which are formed in the subsequent final spinning operation of FIG. 5.

Furthermore, when conditions require, a particular spinning operation may use a plurality of spin rolls in a known manner, such as rough and final spin rolls. The rough roll or rolls may have modified cold working surface shapes coordinated with the working surface of a related final spin roll. These spin rolls may be conveniently arranged at desired angular locations around the spinner axis for radial movement to and from the pulley being spun.

FIG. 12 illustrates a modification in shape of certain zones of the finished pulley wherein reduced thickness recesses 49 are formed at the extremities of the single and double pulley flanges 50 and 51 to reduce belt edge interference when the pulley is engaged with a belt that may have raw or feathered edges.

A further modification of pulley cross-sectional contour also is illustrated in the stepped surface 52 shown in FIG. 12 wherein the steps do not have uniform step dimension increments. For example, the first step 53 closest to the double flange 51 may have a step dimension of 0.038" such that the metal thickness from stepped surface to the base of the V-groove is greater than the thickness of the parent metal, with the second step 54 having a considerably smaller dimension. Also, the increment of dimension change at any step may be much larger than 0.002" or 0.004".

It is to be understood that the various dimensional characteristics of particular pulleys described above are examples with respect to particular pulleys designed to satisfy particular requirements that may be specified.

That is to say, the parent sheet metal from which the cup-shaped blanks are initially formed may have any desired or required gauge or thickness. Similarly, particular pulley dimensions described may differ in each particular pulley size or design.

The pulley structures and manufacturing procedures, however, in accordance with the invention, involve the improved stepped contours and strengths and torque-transmitting characteristics. The increased and decreased radial pulley portion locations, as compared with the location of the cup side wall of the starting cup-shaped blank also characterize the invention.

Accordingly, the new pulley product and various methods of its manufacture satisfy the stated objectives; overcome problems that have been encountered with prior art pulleys; provide a new type of sheet metal poly-V pulley having improved strength, physical properties and cross-sectional contours; and satisfy needs existing in the art.

In the foregoing description, certain terms have been used for brevity, clearness and understanding; but no unnecessary limitations are to be implied beyond the requirements of the prior art, because such terms are used for descriptive purposes and are intended to be broadly construed.

Moreover, the description and illustration of the new pulley structure and of the methods of making the same are by way of example, and the scope of the invention is not limited to the exact details shown or described.

Having now described the features, discoveries, and principles of the invention, the particular new combination of structure features of the new poly-V pulley, the related procedural steps by which the improved pulley may be made, and the advantageous, new and useful results obtained; the new and useful structures, devices, elements, arrangements, procedures, methods and steps in the manufacture of the pulleys are set forth in the appended claims.

We claim:

1. In a poly-V grooved pulley of the type having a V-grooved body wall formed from a sheet metal pulley blank in which the body wall has an annular radially thickened portion located between out-turned single and double walled flanges connected to axial end portions of said body wall, in which said out-turned flanges extend angularly axially outward from V-grooves in said body wall connecting said out-turned flanges with the radially thickened body wall portion, and in which a pulley web wall is joined to said double walled flange; wherein the improvement comprises:
    (a) an inner surface of said body wall having a stepped contour in cross section extending between said body wall axial ends said V-grooves in said body wall each including a V-groove valley and V-groove peaks, the valley being located closer to said inner surface stepped contour than said peaks;
    (b) the stepped contour being defined by a series of cylindrical portions increasing in diameter from the axial end of the body wall connected to the double walled flange to the axial end of the body wall connected to the single walled flange;
    (c) the radial thickness of the thickened body wall metal at the valley of the V-groove adjacent said single walled flange being thinner than the radial thickness of the thickened body wall metal at the valley of the poly-V groove adjacent said double walled flange; and
    (d) said stepped contour being substantially equivalent to a tapered surface such that the body wall in cross section acts as a cantilever beam to provide substantially uniform torque transmitting strength for said thickened poly-V grooved body wall from the axial end of said body wall connected to said double walled flange to the axial end of said body wall connected to said single walled flange.

2. The pulley construction defined in claim 1, in which the extremities of the single and double walled flanges are thinner than the remainder of said flanges.

3. The pulley construction defined in claim 2 in which the thinner flange extremities are formed by tapered surface portions.

4. The pulley construction defined in claim 2 in which the thinner flange extremities are formed by recesses.

5. The method of cold working side wall metal of a cup-shaped sheet metal blank under axial and radial pressure to form a V-grooved body wall of a poly-V-grooved type pulley having terminal body wall single and double wall flanges and a web wall joined with the double wall flange, wherein the improvement comprises reducing the axial length and increasing the thickness of said side wall metal by said axial and radial pressure to form an annular body wall inner surface with a stepped contour of increasing size from pulley web wall to the pulley open end.

6. The method defined in claim 5 in which out-turned flanges are formed at the axial ends of the body wall as the body wall is thickened during formation of said stepped inner surface contour; and in which shallow outer annular grooves are formed at the corners between the thickened body wall and said out-turned flanges.

7. The method defined in claim 5 in which the flanged thickened body wall portion is further subjected to combined axial and radial pressure to form poly-V grooves therein; and in which increased thickness body wall metal is subjected to axial pressure inward of each shallow groove toward the other shallow groove during formation of the poly-V grooved portion of said pulley.

8. The method defined in claim 6 in which said stepped contour and said shallow outer annular grooves are formed simultaneously by said axial and radial pressure.

9. The method defined in claim 6 in which the cup-shaped metal blank side wall is initially reduced in axial length and increased in thickness by combined axial and radial pressure applied thereto; and in which the thus reformed side wall metal is further subjected to combined axial and radial pressure to form the out-turned flanges and said shallow outer annular grooves.

10. The method defined in claim 6 in which the cup-shaped metal blank side wall is initially reduced in axial length and partially increased in thickness by axial pressure to form an outwardly growing bulge; in which the outward bulge growth is limited by a fixed abutment; and in which the thus bulge formed metal is subjected to combined axial and radial pressure to form the out-turned flanges and said shallow outer annular grooves.

11. The method defined in claim 7 in which the extremities of the out-turned flanges are reformed to be thinner than the remainder of said flanges.

12. The method defined in claim 11 in which tapered surface portions are formed on the flanges to provide the thinner flange extremities.

13. The method defined in claim 11 in which recesses are formed in the flanges to provide the thinner flange extremities.

* * * * *